Dec. 15, 1925.   1,566,207
L. H. GRIGGS
RADIUS ROD ASSEMBLAGE
Filed May 29, 1923
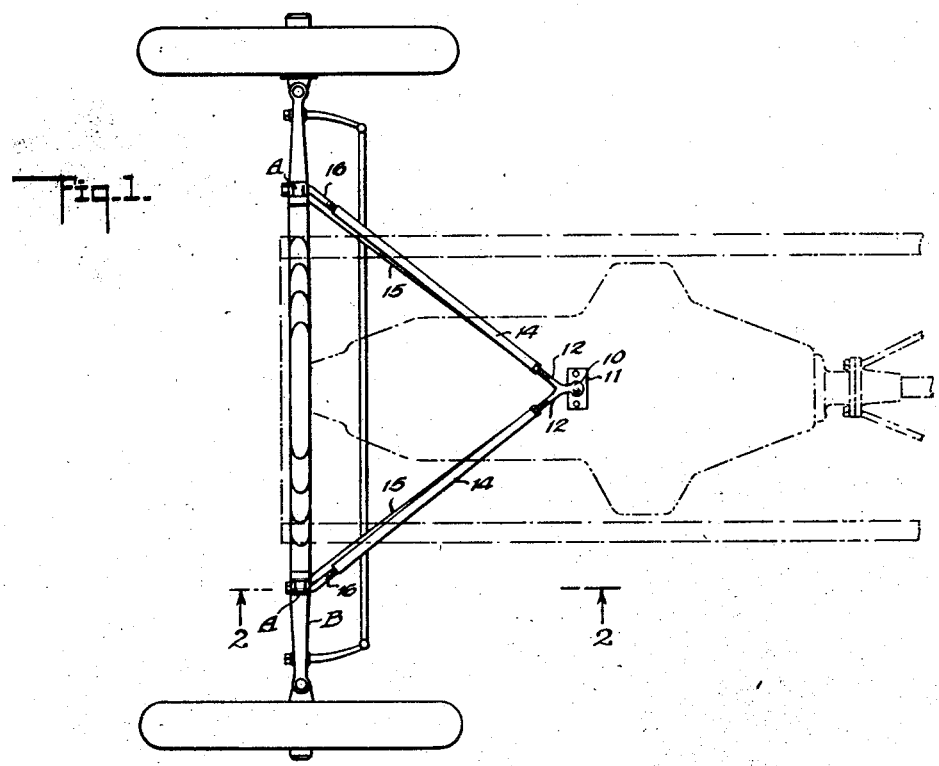
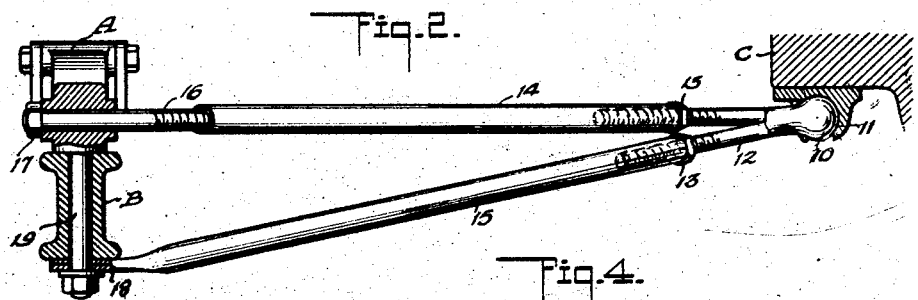
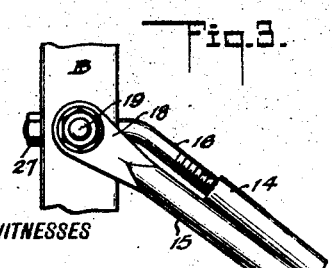
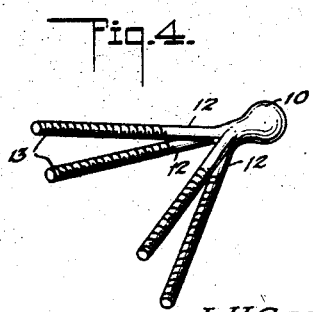
WITNESSES
INVENTOR
L. H. GRIGGS
BY
ATTORNEYS Patented Dec. 15, 1925.

1,566,207

UNITED STATES PATENT OFFICE.

LEON HARVY GRIGGS, OF PUNTA GORDA, FLORIDA.

RADIUS-ROD ASSEMBLAGE.

Application filed May 29, 1923. Serial No. 642,336.

*To all whom it may concern:*

Be it known that I, LEON H. GRIGGS, a citizen of the United States, and a resident of Punta Gorda, in the county of Charlotte and State of Florida, have invented a new and Improved Radius-Rod Assemblage, of which the following is a full, clear, and exact description.

My invention relates to the radius rods of automobiles and has for its object to provide a novel construction of the radius rods and brace rods therefor of a character to permit strength and simplicity and to make provision for a ready renewal of one or more of the rods should occasion require.

The nature of the invention and its distinguishing features will clearly appear as the description proceeds.

Figure 1 is a plan view of a rod assemblage embodying my invention, showing the same applied to the front axle and spring of an automobile.

Figure 2 is an enlarged side elevation, parts of the automobile being in section.

Figure 3 is an inverted plan view of the terminals of the forward ends of two of the rods, and Figure 4 is a perspective view of the attaching unit at the rear end of the rod assemblage.

In the illustrated example, the letter A indicates a spring hanger, B and axle and C part of the bottom of an automobile chassis.

In accordance with my invention, I provide an attaching ball head 10 at the rear end of the rod assemblage similar to known attaching heads, the same being held in a socket 11 in the usual way, said socket being applied to any fixed part C of the automobile. Integral with the head 10 is a plurality of diverging arms 12, there being four in the illustrated example.

The arms 12 are threaded at their forward ends and said threaded ends are adapted to have engagement with internal threads in the tubular rods 14 and 15 constituting radius rods and their braces. On the threaded ends of the arms 12 are nuts 13 for use in adjusting the extent to which the arms enter the tubular rods 14, 15.

The rods 14 have front extensions 16 threaded into said rods and adapted to pass through the spring hangers A, the connection being completed by nuts 17 on said extensions 16. The terminal ends 18 of the lower tubular rods 15 are flattened and are secured by bolts 19 passing through the axle B. The angle of the terminals 18 depends upon the particular bolt arrangement of the automobile.

The head 10 with the integral arms 12 constitutes a unit and permits of the ready removal of a broken rod 14, 15. The rods 14 are arranged in pairs to engage the respective hangers A, while the rods 15 are below the same and diverge downwardly from the plane of the rods 14.

I would state in conclusion that while the illustrated example constitutes a practical embodiment of my invention, I do not limit myself strictly to the mechanical details herein illustrated, since, manifestly, the same can be considerably varied without departure from the spirit of the invention as defined in the appended claims.

Having thus described my invention, I claim:

1. A rod assemblage of the class described for use on automobiles, comprising an attaching ball head provided with two pairs of diverging and threaded arms one pair being disposed horizontally and the other pair inclined downwardly, a pair of tubular rods having their ends internally threaded and into one end of which the horizotal arms of the head screw, extension rods screwing into the other ends of the tubular rods and provided with nuts on their other ends, a second pair of tubular rods having one end internally threaded and into which the downwardly inclined arms of the head screw, the other ends of said rods being flattened and provided with openings, and nuts on the arms of the head and engaging the ends of the tubular rods.

2. In a rod assemblage of the class described, a ball head provided with diverging screw-threaded arms, tubular radius rods having their ends internally threaded, one end of the rods screwing on the arms of the ball head, nuts on said arms and engaging the ends of the radius rods, and extension rods having their ends screw threaded, one end of each rod screwing into a radius rod and its other end provided with a nut.

LEON HARVY GRIGGS.